US012583732B2

(12) United States Patent
Chen

(10) Patent No.: US 12,583,732 B2
(45) Date of Patent: Mar. 24, 2026

(54) SYSTEM FOR AUTOMATIC REFILLING WATER PITCHER

(71) Applicant: Zhuangyong Chen, Alpharetta, GA (US)

(72) Inventor: Zhuangyong Chen, Alpharetta, GA (US)

( * ) Notice: Subject to any disclaimer, the term of this patent is extended or adjusted under 35 U.S.C. 154(b) by 12 days.

(21) Appl. No.: 18/586,863

(22) Filed: Feb. 26, 2024

(65) Prior Publication Data

US 2025/0270084 A1 Aug. 28, 2025

(51) Int. Cl.
*B67D 1/12* (2006.01)
*B67D 1/00* (2006.01)

(52) U.S. Cl.
CPC ........... *B67D 1/124* (2013.01); *B67D 1/0014* (2013.01)

(58) Field of Classification Search
CPC ............... F25D 23/126; F25D 2331/81; F25D 2323/122; F25D 2700/06; B67D 1/1238; B67D 1/124
See application file for complete search history.

(56) References Cited

U.S. PATENT DOCUMENTS 5,490,547 A * 2/1996 Abadi .................. B67D 3/0009 141/82
10,519,025 B2 * 12/2019 Sakthivel .............. F25D 23/126
2009/0288999 A1 11/2009 Lee
2017/0086473 A1 3/2017 Ingold
2017/0137277 A1 5/2017 Comsa et al.
2020/0315397 A1 10/2020 Park et al.

FOREIGN PATENT DOCUMENTS

WO WO-2019130137 A1 * 7/2019

* cited by examiner

*Primary Examiner* — Timothy P. Kelly
(74) *Attorney, Agent, or Firm* — Noblitt & Newson, PLLC

(57) ABSTRACT

An automatically refilling water pitcher according to various aspects of the present technology is configured to provide a readily available source of drinking water that doesn't require an under sink storage tank or a countertop water faucet. In one embodiment, the system comprises a removable water pitcher and a water dispenser. The water dispenser is configured to be responsive to the placement of the water pitcher on a dispenser base and direct filtered water into the water pitcher in response to a signal indicating that the water pitcher is below a predetermined amount.

11 Claims, 2 Drawing Sheets

SYSTEM FOR AUTOMATIC REFILLING WATER PITCHER

BACKGROUND OF THE INVENTION

Water filtration units are common in households and one of the most common types are reverse osmosis water filtration systems. Reverse osmosis systems often have low throughput and are not able to meet demand. To solve this issue, reverse osmosis system require a storage tank to house filtered water until needed. These systems are commonly installed under a kitchen sink with a countertop water faucet connected to the tank. The filtration components and the storage tank take up a substantial amount of cabinet space under the sink. System water pressure is usually insufficient to direct filtered water to the faucet and requires that the storage tank be pressurized. Pressurization is accomplished by an inflatable bladder located inside of the storage tank and reduces the volume of water that can be stored within the tank. A failure of the bladder is typically nonrepairable and requires replacement of the entire storage tank. In addition, the internal volume of the storage tank itself is very difficult if not impossible to clean.

SUMMARY OF THE INVENTION

A system for automatically refilling a water pitcher according to various aspects of the present technology is configured to provide a readily available source of drinking water that doesn't require an under sink storage tank or a countertop water faucet. In one embodiment, the system comprises a removable water pitcher and a water dispenser. The water dispenser is configured to be responsive to the placement of the water pitcher on a dispenser base and direct filtered water into the water pitcher in response to a signal indicating that the water pitcher is below a predetermined amount.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, components that may be coupled together in the manner shown or in a different order are illustrated in the figures to help to improve understanding of embodiments of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of sensors, fittings, valves, fluid conduits, and the like, which may carry out a variety of functions. In addition, the present technology may be practiced in conjunction with any number of processes such as purification of water, carbon filtration, and the system described is merely one exemplary application for the technology. Further, the present technology may employ any number of conventional techniques for providing a ready source of drinking water.

Methods and apparatus for a system for automatically refilling a water pitcher according to various aspects of the present technology may operate in conjunction with any suitable water filtering system or water delivery device. Various representative implementations of the present technology may be applied to any filtering system for treating, pressurizing, and/or providing potable water. For example, in one embodiment, the system for automatically refilling a water pitcher may be coupled to a residential style reverse osmosis filtration device such as an under sink water filtration system with an operating water pressure of between 20-100 psi. Alternatively, the system for automatically refilling a water pitcher may be connected to a standard hot or cold water line such as that used to supply water to a kitchen sink.

The system for automatically refilling a water pitcher may comprise any suitable system for receiving an incoming water supply and directing it into a water pitcher as needed. For example, the system for automatically refilling a water pitcher may be used in place of the traditional RO faucet installed on a sink proximate the regular sink faucet. In addition to eliminating the extra sink-based faucet, the system for automatically refilling a water pitcher may be located away from the sink entirely and positioned in a more convenient or out of the way location. The system for automatically refilling a water pitcher may also eliminate the need for a storage tank under the sink thereby freeing up storage space.

Figure 1:
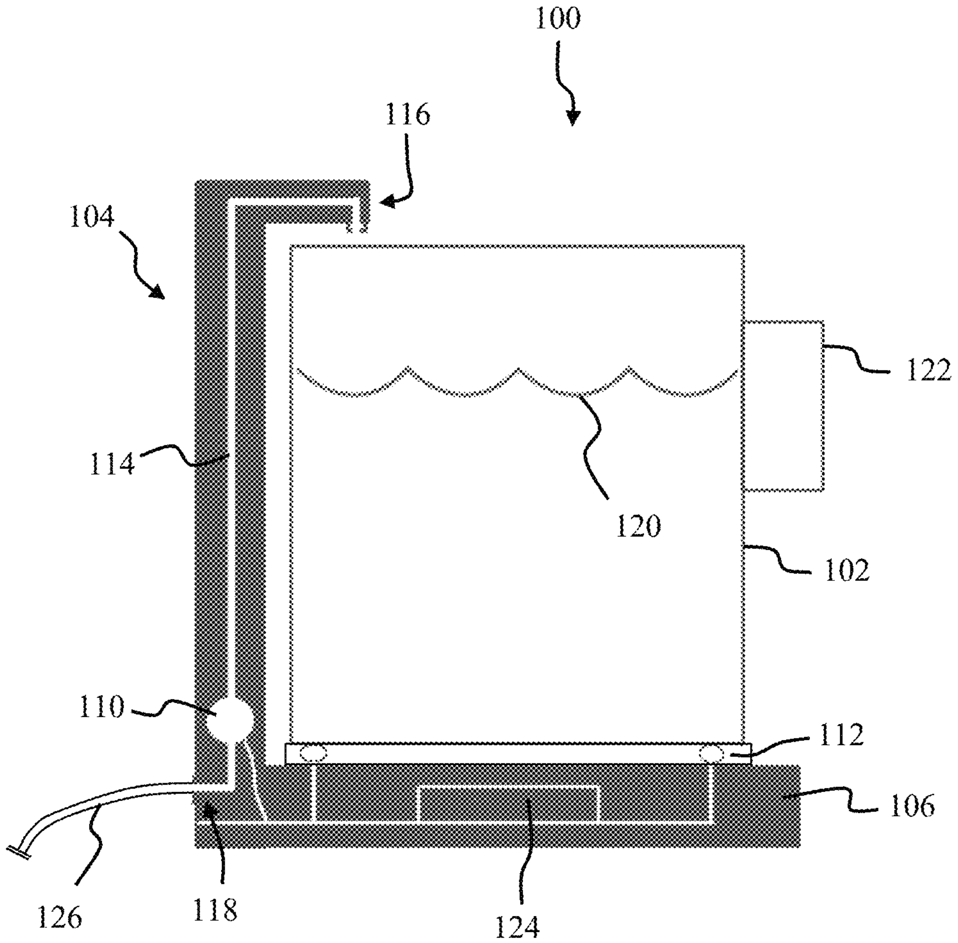
FIG. 1 representatively illustrates a block diagram of a system for automatically refilling a water pitcher in accordance with an exemplary embodiment of the present technology.
Figure 2:
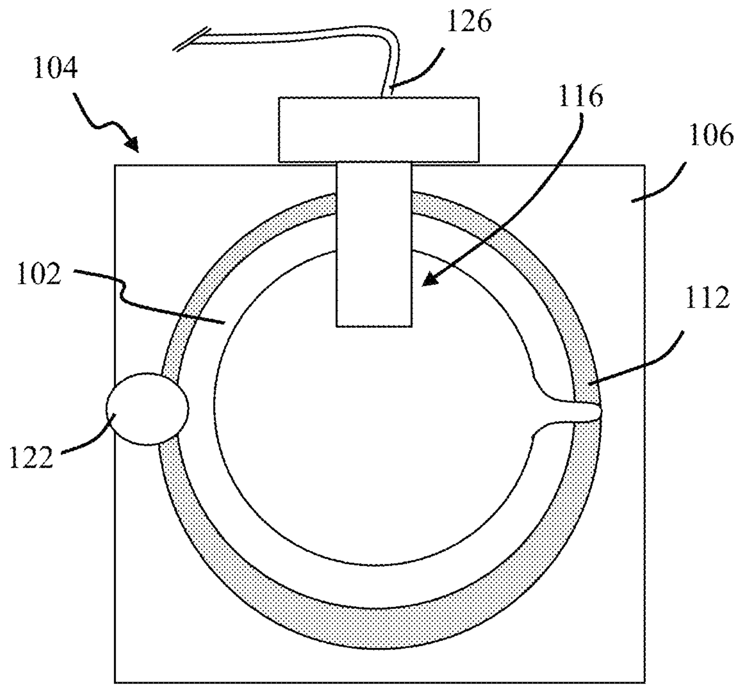
FIG. 2 representatively illustrates a top view of the system for automatically refilling a water pitcher in accordance with an exemplary embodiment of the present technology.

Referring now to FIGS. 1 and 2, methods and apparatus for a system for automatically refilling a water pitcher 100 may comprise a water filling station 104 having a base 106 configured to receive a water pitcher 102 and a faucet 116 for dispensing an incoming water supply into the water pitcher 102. In one embodiment, the water pitcher 102 may be integrated with the filling station 104 and be customized to fit within an area above the base 106 and below the faucet 116. In an alternative embodiment, the water pitcher 102 may comprise any suitable container capable of being positioned on the base 106 and receiving water from the faucet 116 and thereby allow the system for automatically refilling a water pitcher 100 to operate with various type of containers.

The water pitcher 102 may include a handle 122 allowing for ease of use or transport for use. For example, the water pitcher 102 may be removed from the base 106 and carried by the handle 122 to a dining table where it can be used as a standard water pitcher. After use, the water pitcher 102 may be returned to the base and automatically refilled.

The water pitcher 102 may be formed in any suitable size or shape. For example, the water pitcher 102 may comprise dimensions suitable for providing a volume of between about one-half liter and two liters. Alternatively, the water pitcher 102 may be configured to hold a larger volume of up to four to six liters. The water pitcher 102 may also comprise any suitable design features to match a desired décor or style and may be formed from any suitable materials such as plastic, glass, crystal, ceramic, or stainless steel.

The filling station 104 may be configured to be positioned on a surface such as a countertop and may be made of any suitable materials or combination of materials such as plastic, metal, or glass. The base 106 may comprise any suitable device for receiving the water pitcher 102. In one embodiment, the base 106 may include a substantially flat top surface having a rectangular or circular receiving section for the bottom of the water pitcher 102.

The base 106 may include a sensor 112 configured to sense when the water pitcher 102 is positioned on the base. The sensor 112 may comprise any suitable device or system to determine if the water pitcher 102 is full or requires filling. For example, in one embodiment, the sensor 112 may comprise a scale located within the base 106 and be configured to weigh the water pitcher 102 when it is positioned on the base 106. The scale may then communicate the result to a controller 124 included within the filling station 104. In an alternative embodiment, the sensor 112 may be positioned on another part of the filling station 104 and be configured to report the state of the water pitcher 102 by a method other than weight. For example, the sensor 112 may comprise a camera located near the faucet 116 and be positioned to view a level of water within the water pitcher 102. The image(s) provided by the camera may be sent to the sensor for processing.

The filling station 104 may include an inlet 118 configured to receive an incoming water supply 126 and may comprise any suitable device, connector, or coupling for a water line. For example, the inlet 118 may comprise a female portion of a quick connector that is configured to receive a water tube coming from a filter system or other water source. A valve 110 may be installed downstream of the inlet 118 and be configured to control a flow rate of water from the inlet 118 to the faucet 116. A water line 114 may be installed within the filling station 104 between the valve 110 and the faucet 116.

The controller 124 is configured to receive data from the sensor 112 and control the opening and closing of the valve 110 in response to a determined state of the water pitcher 102. The controller 124 may comprise any system or device that is responsive to the signal from the sensor and is configured to open the valve 110 to allow water flow through the faucet until the volume of water in the water pitcher 102 is at a predetermined threshold. For example, in one embodiment, the sensor may be programmed to know the empty weight of the water pitcher 102 and the weight when full. Accordingly, if the water pitcher 102 is placed on the base 106 and the sensed weight is less than the weight when full, the controller 124 may send a signal to the valve 110 causing the valve to open and allow water to flow to the faucet 116. When the weight sensed by the sensor 112 reaches the weight when full of the water pitcher 102, the controller 124 may send another signal to the valve 110 causing it to close and stop the flow of water through the filling station 104.

In another embodiment, the controller 124 may be programmed to allow for an empty water pitcher 102 to be placed on the base 106 and weighed to determine an empty weight. The controller 124 may further be programmed to know how much a given amount of water weighs and to allow a user to enter a volume for the water pitcher 102 being used. The controller 124 may then generate a signal opening the valve 110 and allow water to flow into the water pitcher 102 until the volume is met and another signal is generated closing the valve 110.

In an embodiment where the sensor comprises a camera, then controller 124 may be configured to analyze the images of the water pitcher 102 to determine a height of the water level in the water pitcher 102 and control the valve 110 to allow water to flow through the faucet 116 and into the water pitcher 102 until it is determined that the water level in the water pitcher 102 has reached a desired height below a rim of the water pitcher 102.

The controller 124 is able to maintain the water pitcher 102 in a full state to ensure that a set amount of water is always available. The controller 124 may also be configured to only fill the water pitcher 102 after it has been emptied by a predetermined amount which may help maintain a desired level of freshness to the water.

The controller 124 may further be configured to not activate the valve 110 unless the water pitcher 102 is positioned correctly on the base 106 to prevent spills. The filling station 104 may be configured to not allow water to flow from the faucet 116 unless the proper water pitcher 102 is used. For example, the base 106 may include a safety device that is triggered when the correct water pitcher 102 is positioned on the base 106. Similarly, the controller 124 may be configured to determine the difference between the correct water pitcher 102 and another container to prevent the undesired flow of water. The controller 124 may also be limited to allowing only a maximum amount of water to flow for a given cycle or amount of time. For example, the controller 124 may be programmed to allow a maximum volume of water to flow through the faucet 116 in a single activation cycle. This may help prevent an overflow or runaway flow situation.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises," "comprising," or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same. Any terms of degree such as "substantially," "about," and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

The present technology has been described above with reference to a preferred embodiment. However, changes and modifications may be made to the preferred embodiment without departing from the scope of the present invention. These and other changes or modifications are intended to be included within the scope of the present technology, as expressed in the following claims.

The invention claimed is:

1. A refillable water pitcher, comprising:
a removable water pitcher; and
a filling station, comprising:
  a base disposed along a lower portion of the filling station for receiving the water pitcher;
  a faucet disposed at an upper portion of the filling station and configured to direct an incoming water supply into the water pitcher;
  a valve positioned inside of the filing station upstream of the faucet;
  a sensor positioned in the base and configured to:
    determine when the volume of water in the water pitcher is below a predetermined threshold; and
    generate a signal if the weight of the water pitcher is below the predetermined threshold; and
  a controller responsive to the signal from the sensor, wherein the controller is configured to open the valve to allow water flow to the faucet until the volume of water in the water pitcher is at the predetermined threshold.

2. A refillable water pitcher according to claim 1, wherein the sensor comprises a scale configured to weigh the water pitcher.

3. A refillable water pitcher according to claim 1, wherein the sensor is configured to determine if the water pitcher is removed from the base.

4. A refillable water pitcher according to claim 3, wherein the sensor does not generate the signal when the water pitcher is removed from the base.

5. A refillable water pitcher according to claim 1, further comprising an inlet positioned inside of the filing station upstream from the valve and configured to connect to an incoming water supply.

6. A refillable water pitcher according to claim 5, wherein the filling station further comprises a water line extending between the inlet and the faucet.

7. A countertop water refilling station for a water pitcher, comprising:
a base for receiving the water pitcher;
a water inlet disposed within the base;
a water line disposed within the base and coupled at a first end to the water inlet;
a faucet coupled to a second end of the water line at an upper portion of the countertop water refilling station disposed above the base, wherein the faucet is configured to direct an incoming water supply from the water line into the water pitcher;
a valve positioned within the base and coupled to the water line upstream of the faucet;
a sensor positioned in the base and configured to:
  determine when the volume of water in the water pitcher is below a predetermined threshold;
  generate a signal if the weight of the water pitcher is below the predetermined threshold; and
a controller responsive to the signal from the sensor, wherein the controller is configured to open the valve to allow water flow to the faucet until the volume of water in the water pitcher is at the predetermined threshold.

8. A water refilling station for a water pitcher according to claim 7, wherein the sensor comprises a scale configured to weigh the water pitcher.

9. A water refilling station for a water pitcher according to claim 8, wherein the scale is configured to account for an empty weight of the water pitcher when determining if the volume of water in the water pitcher is below the predetermined threshold.

10. A water refilling station for a water pitcher according to claim 7, wherein the sensor is configured to determine if the water pitcher is removed from the base.

11. A water refilling station for a water pitcher according to claim 10, wherein the sensor does not generate the signal when the water pitcher is removed from the base.

* * * * *